US011401731B1

(12) United States Patent
Seubert et al.

(10) Patent No.: US 11,401,731 B1
(45) Date of Patent: Aug. 2, 2022

(54) BARRIER FOR POTENTIALLY HAZARDOUS EQUIPMENT

(71) Applicant: Faith Technologies, Inc., Menasha, WI (US)

(72) Inventors: Jody David Seubert, Appleton, WI (US); Michael Paul Fox, III, Bowler, WI (US); Mathew Wayde Tresky, Claremore, OK (US)

( * ) Notice: Subject to any disclaimer, the term of this patent is extended or adjusted under 35 U.S.C. 154(b) by 239 days.

(21) Appl. No.: 16/293,958

(22) Filed: Mar. 6, 2019

(51) Int. Cl.
*F16P 1/00* (2006.01)
*E04H 17/14* (2006.01)
*B62B 3/00* (2006.01)

(52) U.S. Cl.
CPC .............. *E04H 17/14* (2013.01); *F16P 1/00* (2013.01); *B62B 3/002* (2013.01)

(58) Field of Classification Search
CPC . H02B 1/14; H02B 1/305; B66C 23/94; B60J 11/00; E01F 13/028; F16P 1/00; E04H 17/14
USPC ......................................................... 293/127
See application file for complete search history.

(56) References Cited

U.S. PATENT DOCUMENTS

| | | | | |
|---|---|---|---|---|
| 559,057 A * | 4/1896 | Fowler | ..................... | D06F 57/04 211/167 |
| 2,945,699 A * | 7/1960 | Berlye | ..................... | B62B 3/108 280/79.3 |
| 3,782,766 A * | 1/1974 | Teel | ......................... | B60R 19/02 293/117 |
| 3,788,268 A * | 1/1974 | Hiatt | ...................... | B60Q 7/005 116/28 R |
| 3,812,978 A * | 5/1974 | Roland | .................... | B66C 23/94 213/201 |
| 3,870,367 A * | 3/1975 | O'Brien | .................... | B62B 1/20 298/1 B |
| 4,183,695 A * | 1/1980 | Wilcox | ................... | E01F 13/02 116/63 R |
| 4,255,608 A | 10/1981 | Bosch et al. | | |
| 4,434,901 A * | 3/1984 | Gehl | ....................... | B66C 23/94 212/276 |
| 4,524,953 A * | 6/1985 | Phillips | ..................... | E04H 6/42 256/1 |
| 5,575,492 A * | 11/1996 | Stone | ........................ | B60S 9/04 248/352 |
| 5,743,583 A * | 4/1998 | Lowe | ........................ | B60P 3/00 211/195 |
| 5,816,946 A * | 10/1998 | Grossman | ............ | A63B 71/022 473/451 |

(Continued)

FOREIGN PATENT DOCUMENTS

CN 205777883 U 12/2016
KR 200414681 Y1 4/2006

*Primary Examiner* — Emma K Frick
(74) *Attorney, Agent, or Firm* — Randall W. Fieldhack

(57) ABSTRACT

A barrier system for equipment having four corners and four sides includes an arm pivotally attached to each of two adjacent corners, each arm configured to have an extended position and a stored position, wherein each arm has a proximal region and a distal region, wherein the proximal region of each arm is attached to a corner, wherein each arm is parallel to another arm when both are in the stored position, and wherein each arm is not parallel to another arm when both are in the extended position; and a safety barrier attached to the distal regions of the adjacent arms.

17 Claims, 5 Drawing Sheets

(56) References Cited

U.S. PATENT DOCUMENTS

| | | | | |
|---|---|---|---|---|
| 6,102,373 | A * | 8/2000 | Amsinger | B66C 23/94 |
| | | | | 212/276 |
| 6,213,047 | B1 * | 4/2001 | Means | B60Q 1/2692 |
| | | | | 116/28 R |
| 6,219,249 | B1 * | 4/2001 | Tuccio | H05K 7/183 |
| | | | | 312/223.2 |
| 6,715,238 | B2 * | 4/2004 | Zambelli | A62B 35/0043 |
| | | | | 52/24 |
| 7,150,306 | B2 * | 12/2006 | Ghazali | B60J 11/00 |
| | | | | 160/370.21 |
| 7,273,154 | B1 * | 9/2007 | Edwards | D06F 53/02 |
| | | | | 211/119.01 |
| 7,690,858 | B1 * | 4/2010 | Chiavola | E01F 13/028 |
| | | | | 404/6 |
| 7,726,634 | B2 * | 6/2010 | Neal | E01F 13/028 |
| | | | | 256/47 |
| 7,841,269 | B1 * | 11/2010 | Jacobs | F41H 5/013 |
| | | | | 89/36.08 |
| 8,453,996 | B1 * | 6/2013 | Papadopoli | A63J 99/00 |
| | | | | 256/23 |
| 8,740,267 | B1 * | 6/2014 | Wilson | B60Q 1/50 |
| | | | | 293/22 |
| 8,777,512 | B2 * | 7/2014 | Henderson | E01F 13/02 |
| | | | | 404/9 |
| 8,782,935 | B2 | 7/2014 | Forehand et al. | |
| 9,045,881 | B1 * | 6/2015 | Schlueter | E02F 9/0858 |
| 9,151,445 | B2 | 10/2015 | Forehand | |
| 9,627,863 | B1 | 4/2017 | Harrison | |
| 10,077,171 | B2 * | 9/2018 | Chustz | B66C 15/06 |
| 10,125,923 | B2 * | 11/2018 | Beaudoin | F16P 3/08 |
| 10,300,845 | B2 * | 5/2019 | Maiorana | B60W 50/14 |
| 2015/0069312 | A1 * | 3/2015 | Cooper | B66B 5/00 |
| | | | | 256/26 |

* cited by examiner

BARRIER FOR POTENTIALLY HAZARDOUS EQUIPMENT

BACKGROUND

The present disclosure relates to safety barriers used in conjunction with potentially hazardous equipment. For example, electrocution and arc flash concerns dictate a need for a clearance zone surrounding electrical panels to avoid inadvertent contact with an energized system. This is particularly important in the case of temporary equipment that can be moved to and around a job site. Because such pieces of equipment do not have a permanent location, long term protections are more difficult to enact. In addition, workers in the area might be unaware of an electrical panel or other equipment that has newly appeared on their job site.

A common way to provide a clearance zone around temporary equipment is to use portable stanchions connected by rope, tape, or ribbon. A major shortfall of this system, however, is that the stanchions might be moved relative to the equipment, or the equipment might be moved relative to the stanchions, leaving the equipment without a minimum clearance zone. In addition, the stanchions might not travel with the equipment when the equipment is moved to another location on the job site. Finally, moving stanchions takes up valuable time that a worker could otherwise use to perform constructive work.

SUMMARY

The present disclosure solves these problems by providing a safety barrier solution that moves with equipment, easily ensuring that a minimum clearance zone is always maintained around potentially hazardous equipment.

In one aspect, the present disclosure provides a barrier system for equipment, the equipment having four corners and four sides, the system including an arm pivotally attached to each of two adjacent corners, each arm configured to have an extended position and a stored position, wherein each arm has a proximal region and a distal region, wherein the proximal region of each arm is attached to a corner, wherein each arm is parallel to another arm when both are in the stored position, and wherein each arm is not parallel to another arm when both are in the extended position; and a safety barrier attached to the distal regions of the adjacent arms.

In another aspect, the present disclosure provides a barrier system for equipment, the equipment having four corners, four sides, and four wheels, the system including an arm attached to each corner adjacent the wheels, each arm configured to have an extended position and a stored position, wherein each arm has a proximal region and a distal region, wherein the proximal region of each arm is attached to a corner, wherein each arm is parallel to another arm when both are in the stored position, and wherein each arm is not parallel to another arm when both are in the extended position; and a safety barrier removably attached to the distal regions of adjacent arms, wherein the safety barrier has at least two sections, and wherein each section is attached between adjacent arms.

In a further aspect, the present disclosure provides a barrier system for equipment, the equipment having four corners, four sides, four wheels, and access points on at least two sides, the system including each of four arms pivotally attached to a bracket, with each bracket attached to a corner, each arm configured to have an extended position and a stored position, wherein each arm has a proximal region and a distal region, wherein the proximal region of each arm is attached to a corner adjacent a wheel, wherein each arm is parallel to another arm when both are in the stored position, and wherein each arm is not parallel to another arm when both are in the extended position; a safety barrier removably attached between the distal regions of each pair of adjacent arms; and an anchor structure having an anchor restraint attached to a corner and to the arm associated with that corner, the anchor structure configured to limit extension of the arm, wherein the anchor structure includes a clip configured to hold the arm in the stored position, wherein the four distal regions define a horizontal plane when in the extended position, and wherein the system is configured to provide at least a minimum clearance zone between the equipment and the safety barrier in all directions in the horizontal plane.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
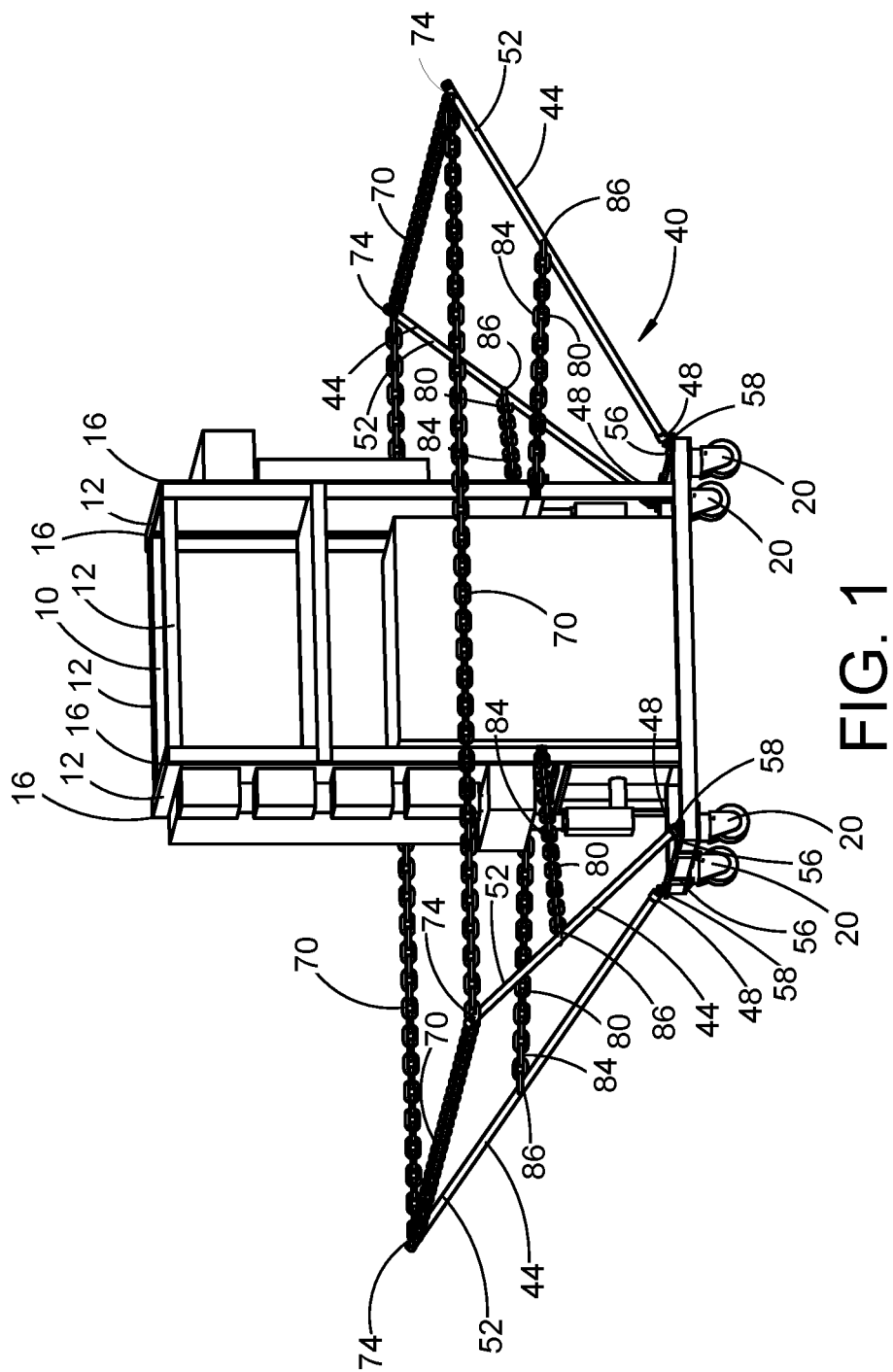
FIG. 1 representatively illustrates a perspective view of a barrier system for temporary equipment as described in the present disclosure, where the barrier system is in its extended position.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents.

The present disclosure is directed to a safety barrier solution to increase the awareness of and to limit inadvertent access to electrical or other equipment, particularly when the equipment is energized, and particularly when the equipment is temporary. In one aspect, the safety barrier solution moves with the temporary equipment, easily ensuring that a minimum clearance zone is always maintained around energized equipment. This safety barrier solution will help workers and businesses stay compliant with safety rules. In this aspect, the safety barrier solution, once in use, stays with the temporary equipment and ensures that a mandatory minimum clearance zone, sometimes three or more feet, is maintained at all times.

The safety barrier solution disclosed herein can be used in conjunction with any sort of potentially hazardous equipment. Such equipment can be temporary or permanent, mobile or fixed, and is equipment that could be dangerous to personnel and/or property if improperly handled. The potential hazards associated with such equipment include electricity, compressed gases, pressurized liquids, heat or cold, heated substances, chemicals, radioactivity, ultraviolet radiation, biohazards, explosives, and any combination of these. For purposes of illustration, electrical equipment of a type in common use is described as an example herein.

Figure 2:
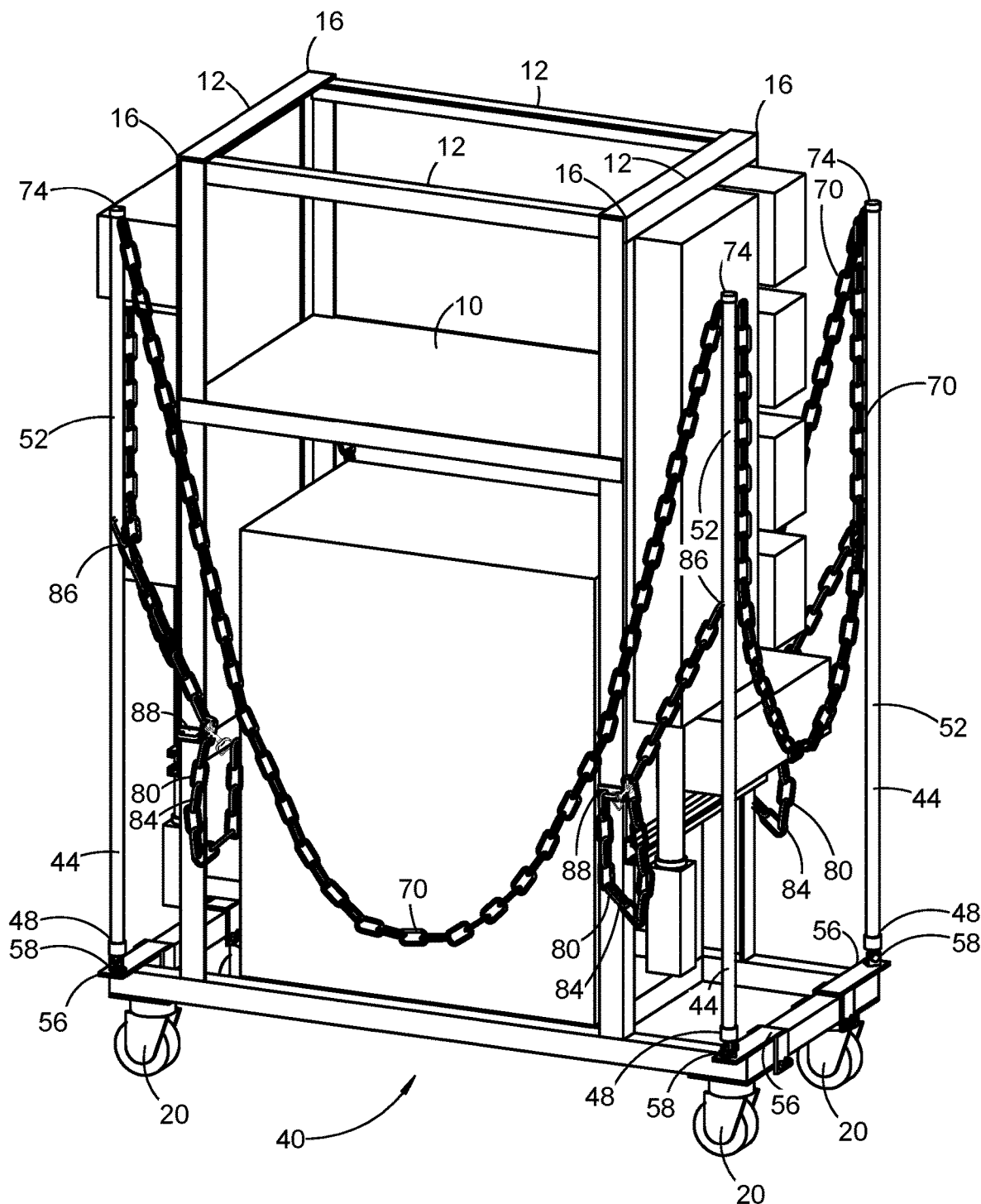
FIG. 2 representatively illustrates a perspective view of the barrier system for the temporary equipment of FIG. 1, where the barrier system is in its stored position.
Figure 3:
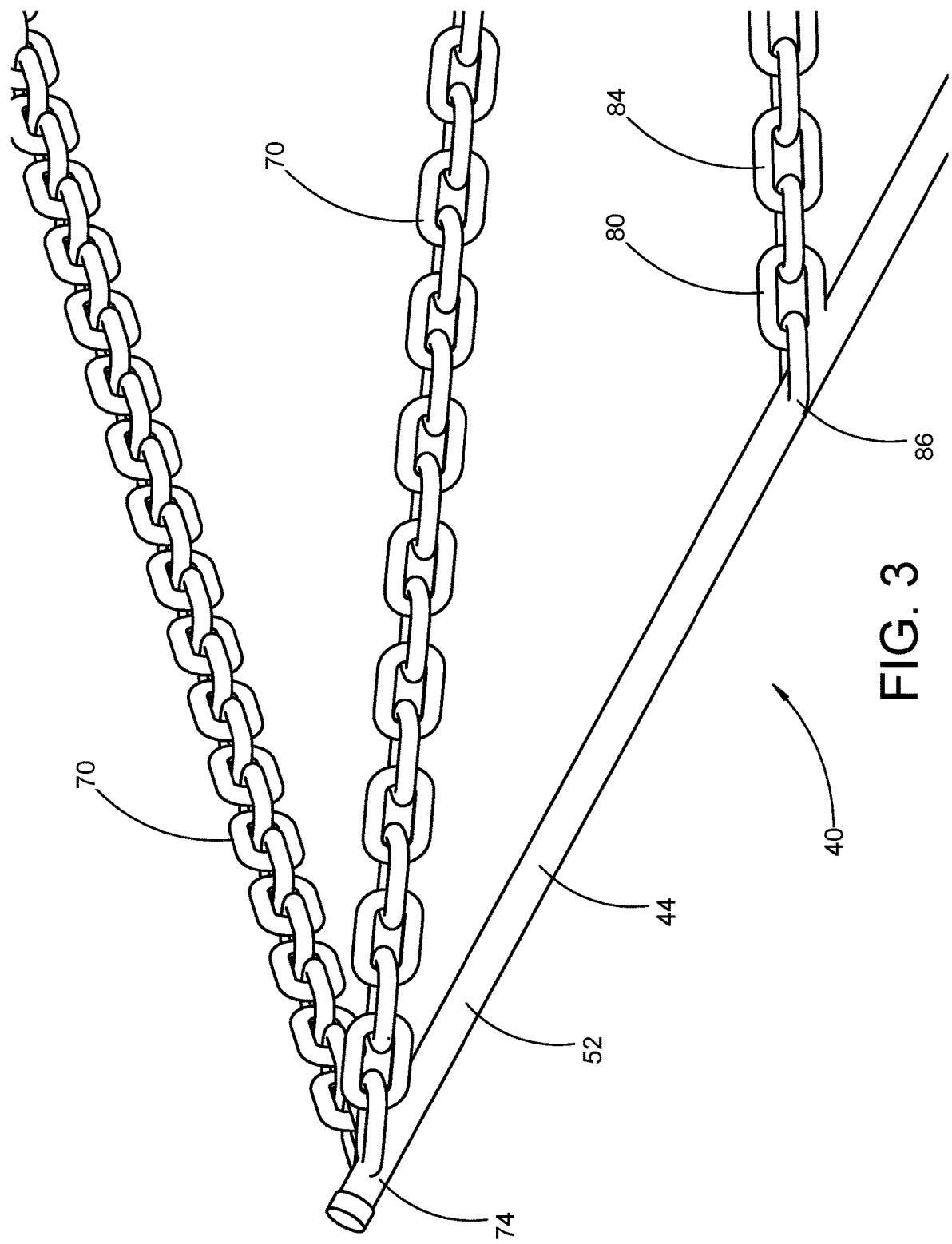
FIG. 3 representatively illustrates a perspective view of a safety barrier detail of the barrier system for the temporary equipment of FIG. 1.

As illustrated in FIGS. 1 and 2, the temporary electrical equipment 10 of the present disclosure is typically portable or movable, allowing personnel to move the equipment 10 to where it is needed. The equipment 10 can, for example, be used to provide temporary power on a job site. Such equipment 10 typically has four sides 12 meeting to form four corners 16, although the sides 12 are not necessarily planar and the corners 16 are not necessarily linear. The outer edges or envelope of the equipment 10 is defined by the equipment disposed in or on the equipment 10, such as breakers, sub-panels, power converters, power inverters, transformers, etc. Each component can be considered an access point because a person might need to access any component present on or in the equipment 10. Such components can be present on one or more sides 12 of the equipment 10, resulting in access points on one or more sides 12 of the equipment 10. The equipment 10 will also typically have connection points to allow power to be brought to and from the equipment 10.

The equipment 10 can include wheels 20 to be movable to and around a job site. Wheels 20 are typically located adjacent the corners 16 of the equipment 10 for stability. Alternatively, the equipment 10 can be mounted on a skid or other framework (not shown) allowing the equipment 10 to be moved by forklift, dolly, pallet jack, crane, or any other suitable mechanism.

The equipment 10 of the present disclosure can be provided with a barrier system 40 to increase safety of and around the equipment 10 during use, particularly when the equipment 10 is energized. The barrier system 40 can be removably or fixedly attached to the equipment 10 itself, providing a safety barrier 70 that is movable with the equipment 10. As used herein, the term "attached" means that one element can be affixed or otherwise connected directly to a second element, or that one element can be indirectly connected to a second element through one or more intervening elements. In other words, a statement that element A is attached to element B does not preclude the inclusion of one or more intervening elements. Further, an attachment can be more temporary, such as with a clamp, a bolt, or any other suitable mechanism, or the attachment can be more permanent, such as by welding or other suitable connection process.

Figure 5:
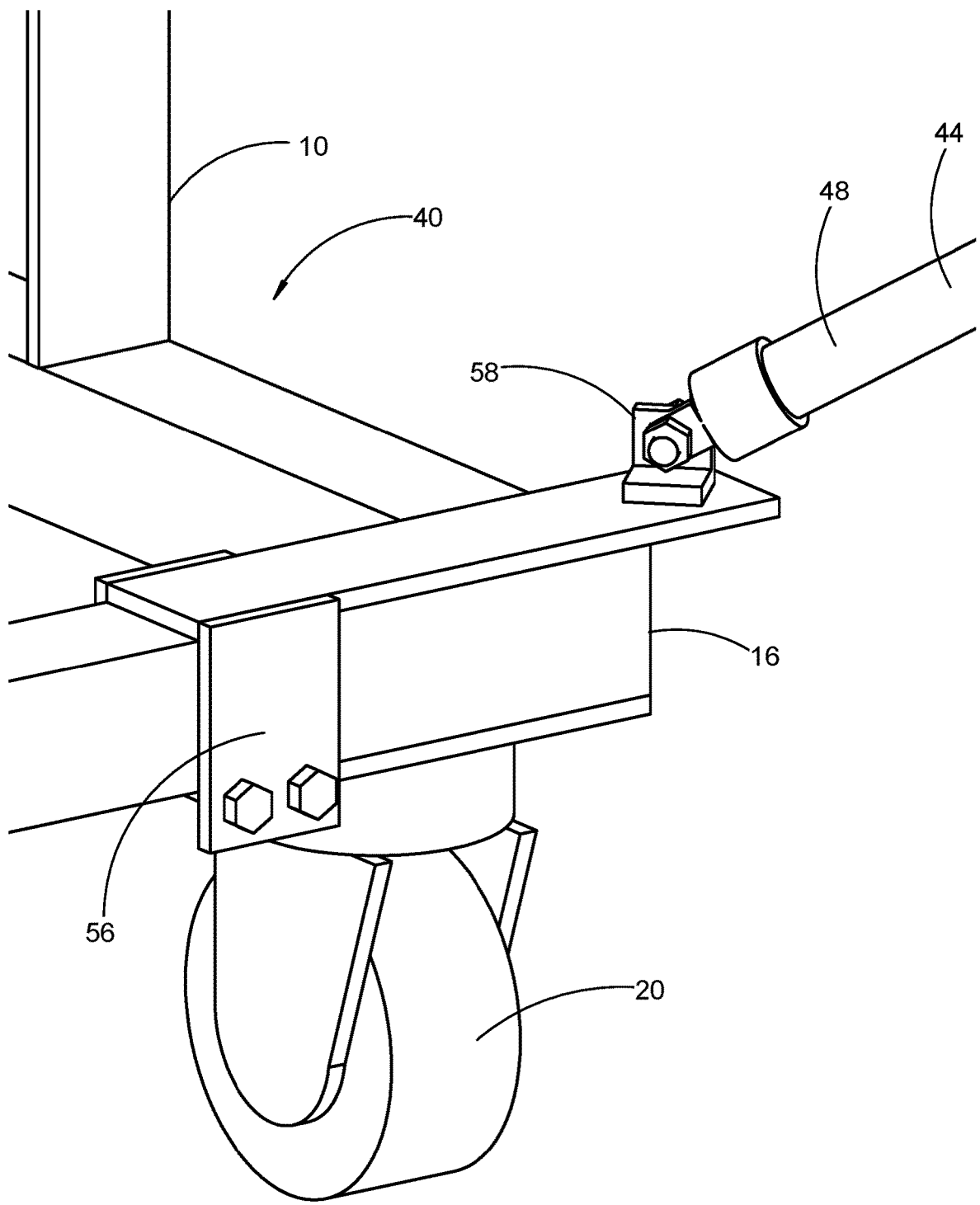
FIG. 5 representatively illustrates a perspective view of a hinge mechanism and bracket detail of the barrier system for the temporary equipment of FIG. 1.

The barrier system 40 includes four generally elongate arms 44. Each arm 44 has a proximal region 48 and a distal region 52. The proximal region 48 of each arm 44 is attached to a bracket 56 using a pivotable joint, in this aspect a hinge mechanism 58 (see FIG. 5), allowing the arm 44 to pivot between a position immediately adjacent a corner 16 to a position extending from a corner 16. The bracket 56 is then attached to the equipment 10 adjacent a corner 16 of the equipment 10. If wheels 20 are present, the bracket 56 will also be attached to the equipment 10 adjacent a wheel 20. The bracket 56 can be attached to the equipment 10 by welding, using an external clamp, using a clamp integral with the bracket 56 or the equipment 10, by using adhesive, or by any suitable temporary or permanent attachment method. In other aspects of the present disclosure, the arm 44 can be hingedly attached directly to the equipment 10 without an intervening bracket 56.

In an alternate aspect of the present disclosure, the arms 44 can be removably attached to the equipment 10. The hinge mechanism 58 and in some aspects the bracket 56 for one or more arms 44 can be replaced by a sleeve or pin attached to the equipment 10. In these aspects, an arm 44 can slide into a sleeve or onto a pin such that the arm 44 is set in an extended position. When not in an extended position, the arm 44 can be removed from the sleeve or pin and either carried separately from the equipment 10 or stored on or in the equipment 10 in a stored position. In another alternate aspect, two sleeves or pins are attached to the equipment 10 at each corner 16. One sleeve or pin can be angled such that the arm 44, when engaging that sleeve or pin, is set in the extended position. The other sleeve or pin can be angled such that the arm 44, when engaging that sleeve or pin, is set in the stored position.

Each arm 44 is configured to have a stored position (see FIG. 2) where the arm 44 is positioned immediately adjacent a corner 16 of the equipment 10. Each arm 44 is also configured to have an extended position (see FIG. 1) where the arm 44 is positioned extending away from a corner 16 of the equipment 10 immediately adjacent a corner 16 of the equipment 10. As a result, when each arm 44 is in its stored position adjacent a corner 16 of the equipment 10, each arm 44 will be generally parallel with the other arms 44 and the corners 16. Conversely, when each arm 44 is in its extended position extending away from a corner 16, each arm 44 will not be parallel with the other arms 44 or with the corners 16.

The barrier system 40 further includes a safety barrier 70 attached to and extending between the distal regions 52 of two adjacent arms 44. In a particular aspect of the present disclosure, a safety barrier 70 extends between the distal regions 52 of each pair of adjacent arms 44. In other words, the barrier system 40 can include four sections of safety barrier 70 extending between the distal regions 52 of the four arms 44. The sections of safety barrier 70 can be separate sections, or can be different portions of a continuous safety barrier 70. In various aspects, each section of the safety barrier 70 can be removable or permanently attached to the arms 44. Each distal region 52 can include a ring or other mounting point 74 attached to the arm 44. A safety barrier 70 can then be attached to the mounting point 74, connected to the mounting point 74 using any suitable clip or pin, such as a spring-loaded pin, tied to the mounting point 74, or passed through an opening in the mounting point 74. The safety barrier 70 can also be attached directly to the arm 44. Depending on the material selected for the safety barrier 70, the desired angle of the arms 44, and the length(s) chosen for the safety barriers 70, the safety barriers 70, when the arms 44 are in their extended positions, can be relatively straight as illustrated in FIG. 1, or can drape to a desired curvature.

The safety barrier 70 can be any suitable material including metal or plastic chain, ribbon, fabric, tape, rope, cable, etc. The safety barrier 70 can include warnings embedded in, hanging from, or otherwise associated with the safety barrier 70. Such warnings can include a sign. Such warnings can include words such as danger, caution, or access limited. Such warnings can also include graphic representations of danger for those who cannot read or who are not familiar with the local language. The safety barrier 70 and the barrier system 40 in general can include bright colors such as yellow, orange, or red to provide a visual signal and to increase awareness of the safety barrier 70. The safety barrier 70 can also provide some level of physical protection against inadvertent access to the equipment 10.

In other aspects of the present disclosure, the barrier system 40 can include a second safety barrier (not shown) attached to the arms 44, thereby forming a second perimeter spaced apart from and at a lower elevation than the first safety barrier 70.

Figure 4:
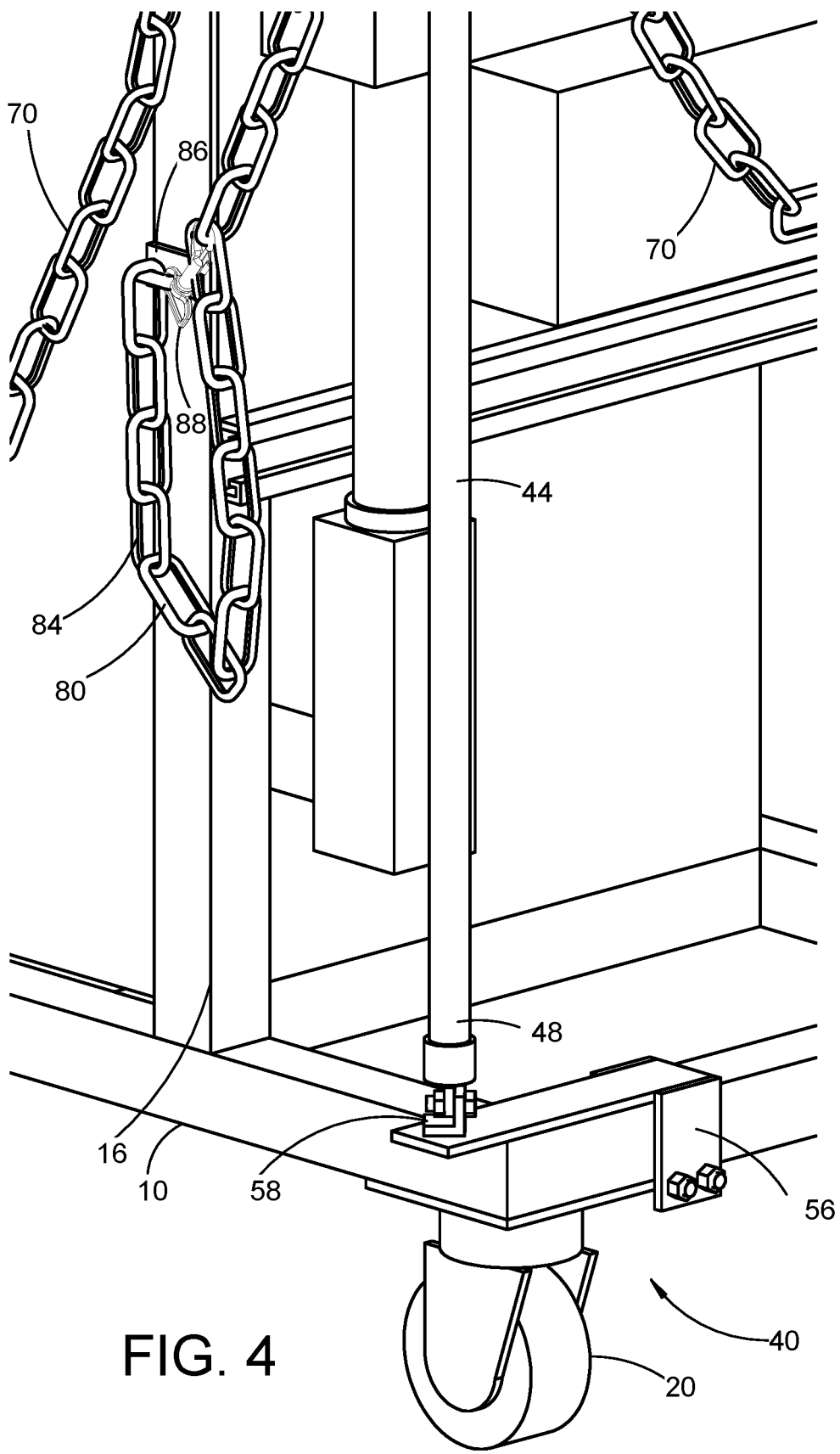
FIG. 4 representatively illustrates a perspective view of an anchor structure detail of the barrier system for the temporary equipment of FIG. 1.

As illustrated in FIGS. 1, 2, and 4, the barrier system 40 can also include an anchor structure 80 to hold each arm 44 in its intended position and to limit the degree of extension of each arm 44. The anchor structure 80 for a given arm 44 can include an anchor restraint 84 removably or permanently attached to both the corner 16 and the arm 44. The anchor restraint 84 can be a chain, a rope, a cable, or other suitable material sized to allow the arm 44 to be extended a certain distance or to a certain angle. Gravity will hold the arm 44 in its extended position and the anchor restraint 84 will prevent it from extending further. Each arm 44 and each corner 16 can include a ring or other restraint mounting point 86 attached to the arm 44 and/or corner 16, respectively. An anchor restraint 84 can then be attached to the restraint mounting point(s) 86, connected to the restraint mounting point(s) 86 using any suitable clip or pin, such as a spring-loaded pin, tied to the restraint mounting point(s) 86, or passed through an opening in the restraint mounting point 86. The anchor restraint 84 can also be attached directly to the arm 44 and/or corner 16.

The anchor structure 80 for a given arm 44 can also include an anchor clip 88 to hold the arm 44 in its stored position. The anchor clip 88 can be a chain, a rope, a cable, a snap clip, any other suitable clip, or other suitable material removably or permanently attached to one or more of a corner 16, an arm 44, and a restraint mounting point 86. The purpose of the anchor clip 88 is to temporarily attach the arm 44 to the corner 16 or equipment 10 when the arm 44 is in its stored position such that the arm 44 remains in its stored position. In other aspects, the anchor clip 88 can be a strap, a magnet, a pin, or any other suitable structure that will allow the arm 44 to be temporarily attached to the corner 16 or equipment 10.

In another aspect of the present disclosure, the anchor structure 80 can be a ratcheting mechanism (not shown) within or associated with the hinge mechanism 58. The arm 44 can then be extended to the desired extended position, or ratcheted back to the stored position.

When the arms 44 of the barrier system 40 are in their extended positions (see FIG. 1) with safety barriers 70 extending between the distal regions 52 of the arms 44, the barrier system 40 forms a continuous barrier around the equipment 10. When viewed from above, the continuous barrier will resemble a square or a rectangle dependent on the shape of the equipment 10. The continuous barrier will have a minimum distance between a side 12 of the equipment 10 and the safety barrier 70 facing that side 12. This distance will be determined by the length and angle of the arms 44, and can easily be calculated for a design or measured in the field. Alternatively, a minimum safe distance can be selected, with the length and angle of the arms 44 determined to provide that distance. The necessary minimum clearance zone required for safety can vary by type of hazard, job site, installer, equipment type, intended use, government entity, etc. A typical minimum safe distance is three feet.

In an alternate view, when the arms 44 of the barrier system 40 are extended, the distal regions 52 of the arms 44 define a generally horizontal plane. The dimensions and angles of the arms 44 are selected such that the distance between the equipment 10 and the safety barrier 70 along that plane is at least a minimum safe distance in all directions. A typical minimum safe distance is three feet. It should be noted that, as an example, if the minimum distance, which is found between an equipment side 12 and a safety barrier 70 at a centerline of the equipment 10, is three feet, a distance measurement taken away from the centerline, and particularly at the corners 16, will be greater than three feet.

In use, the barrier system 40 of the present disclosure can add a factor of safety in the workplace. To use, the barrier system 40 is attached to the temporary equipment 10 with each arm 44 attached to a corner 16 of the equipment 10. The arm 44 is either attached directly to the equipment 10 or indirectly through a bracket 56. The arms 44 are then lowered to their extended positions (see FIG. 1), a position that is determined by the anchor structure 80 for each arm 44. Safety barriers 70, if not already attached, are then attached between the distal regions 52 of adjacent arms 44 such that, when viewed from above, the safety barrier 70 forms a square or rectangular perimeter surrounding the equipment 10 and delineating a minimum safe distance from the equipment 10. The safety barrier 70 is intended to provide awareness and protection in the space surrounding equipment 10, particularly one that is energized. To work on the equipment 10 or to make connections with the equipment 10, a properly-authorized worker with appropriate personal protective equipment can unhook the relevant safety barrier 70 to approach the equipment 10. The worker then replaces the safety barrier 70 while working or after completing the work.

When the equipment 10 needs to be moved, the arms 44 can be moved to their stored positions (see FIG. 2) and set in place using the anchor structure 80. The safety barriers 70 can remain attached to the arms 44 or can be removed. The equipment 10 can then be moved, including fitting through doorways. Once the equipment 10 is in its new position, the barrier system 40 can be re-deployed as described above.

In another aspect of the present disclosure, the barrier system 40 can be used in conjunction with equipment 10 affixed to or adjacent to a wall. In this aspect, only two arms 44 will typically be needed. The safety barrier 70 will be attached to the distal regions 52 of both arms 44 and to the wall on either side of the equipment 10 in a manner suitable to provide at least a minimum clearance zone. The barrier system 40 will in other respects work as described above.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. A barrier system for equipment, the equipment having a rectangular frame defining four corners and four sides with a wheel attached to the rectangular frame at each corner, and access points on at least two sides, the system comprising:

each of four arms pivotally attached to a bracket with a hinge mechanism, with each bracket attached to the rectangular frame at a corner, each arm configured to pivot between an extended position and a stored position while remaining attached at its corner, wherein each arm has a proximal region and a distal region, wherein the proximal region of each arm is attached to the rectangular frame at a corner adjacent a wheel, wherein each arm is substantially vertical and parallel to another arm when both arms are in the stored position, and wherein each arm is at an acute angle to vertical and not parallel to another arm when both arms are in the extended position;

a safety barrier removably attached between the distal regions of each pair of adjacent arms; and an anchor structure associated with each corner, each anchor structure having an anchor restraint attached to the arm associated with that corner and to the equipment, the anchor structure configured to limit extension of the arm, wherein the anchor structure includes a clip configured to hold the arm in the stored position, wherein the four distal regions define a horizontal plane when the arms are in the extended position, and wherein the system is configured to provide at least a minimum clearance zone between the equipment and the safety barrier in all directions in the horizontal plane.

2. A barrier system for equipment, the equipment having a rectangular frame defining four corners with a wheel attached to the rectangular frame at each corner, the system comprising:

an arm attached to the rectangular frame with a hinge mechanism at each corner adjacent the wheels, each arm configured to pivot between an extended position and a stored position while remaining attached at its corner, wherein each arm has a proximal region and a distal region, wherein the proximal region of each arm is attached to the rectangular frame at a corner, wherein each arm is substantially vertical and parallel to another arm when both arms are in the stored position, and wherein each arm is at an acute angle to vertical and not parallel to another arm when both arms are in the extended position;

four anchor structures, one associated with each arm, each anchor structure having an anchor restraint attached to its associated arm and to the equipment, each anchor structure configured to limit extension of its associated arm; and a safety barrier removably attached to the distal regions of adjacent arms, wherein the safety barrier has at least two sections, and wherein each section is attached between adjacent arms.

3. The system of claim 2, the anchor structure including a clip configured to hold the arm in the stored position.

4. The system of claim 2, wherein each arm is attached to a bracket and each bracket is attached to the rectangular frame at the corner associated with the arm.

5. The system of claim 2, wherein the four distal regions define a horizontal plane when the arms are in the extended position, and wherein the system is configured to provide at least three feet of space between the equipment and the safety barrier in all directions in the horizontal plane.

6. The system of claim 2, wherein the equipment is an electrical panel.

7. A barrier system for equipment, the equipment having a rectangular frame defining four corners and four sides, the system comprising:

a first arm pivotally attached to the rectangular frame at a first corner with a first hinge mechanism and a second arm pivotally attached to the rectangular frame at a second, adjacent corner with a second hinge mechanism, each arm configured to pivot between an extended position and a stored position while remaining attached at its corner, wherein each arm has a proximal region and a distal region, wherein the proximal regions of the first and second arms are attached to the first and second corners, respectively, wherein the first and second arms are substantially vertical and parallel when both arms are in the stored position, and wherein the first and second arms are at an acute angle to vertical and not parallel when both arms are in the extended position; and a safety barrier attached to the distal regions of the first and second arms.

8. The system of claim 7, wherein the safety barrier is removably attached to a distal region.

9. The system of claim 7, further comprising third and fourth arms pivotally attached to the rectangular frame at third and fourth corners with third and fourth hinge mechanisms, respectively, wherein the safety barrier has at least two sections, and wherein each section is attached between adjacent arms.

10. The system of claim 7, further comprising an anchor structure having an anchor restraint attached to the first arm, the anchor structure configured to limit extension of the first arm.

11. The system of claim 10, wherein the anchor restraint is also attached to the equipment.

12. The system of claim 10, the anchor structure including a clip configured to hold the arm in the stored position.

13. The system of claim 7, wherein the first arm is attached to a bracket and the bracket is attached to the rectangular frame at the first corner.

14. The system of claim 7, the equipment further comprising wheels attached to the rectangular frame, wherein the arms are attached to the rectangular frame adjacent the wheels.

15. The system of claim 7, further comprising first, second, third, and fourth arms pivotally attached to the rectangular frame at first, second, third, and fourth corners, respectively, wherein the distal regions of each arm define a horizontal plane when in the extended position, and wherein the system is configured to provide at least three feet of space between the equipment and the safety barrier in all directions in the horizontal plane.

16. The system of claim 7, the equipment further comprising access points on at least two sides.

17. The system of claim 7, wherein the equipment is an electrical panel.

\* \* \* \* \*